United States Patent
Byun et al.

(10) Patent No.: US 9,869,233 B2
(45) Date of Patent: Jan. 16, 2018

(54) FAULT DIAGNOSIS METHOD OF THERMOSTAT

(71) Applicant: Hyundai Motor Company, Seoul (KR)

(72) Inventors: Jung Sup Byun, Seongnam-si (KR); Seong Kyu Park, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 132 days.

(21) Appl. No.: 14/932,654

(22) Filed: Nov. 4, 2015

(65) Prior Publication Data

US 2017/0023439 A1  Jan. 26, 2017

(30) Foreign Application Priority Data

Jul. 23, 2015  (KR) .................. 10-2015-0104569

(51) Int. Cl.
  F01P 7/16  (2006.01)
  G01M 99/00  (2011.01)
(52) U.S. Cl.
  CPC ........... *F01P 7/165* (2013.01); *G01M 99/002* (2013.01); *F01P 2025/30* (2013.01); *F01P 2025/32* (2013.01)
(58) Field of Classification Search
  CPC ..................................... F01P 7/165
  USPC ..................................... 73/114.68
  See application file for complete search history.

(56) References Cited

U.S. PATENT DOCUMENTS

| | | | |
|---|---|---|---|
| 6,321,696 B1* | 11/2001 | Nishioka | F01P 11/16 123/41.15 |
| 2005/0224019 A1* | 10/2005 | Kim | F01P 5/14 123/41.1 |
| 2006/0019136 A1* | 1/2006 | Alp | H01M 8/04029 429/434 |
| 2013/0255599 A1* | 10/2013 | Jentz | F01P 11/14 123/41.1 |

FOREIGN PATENT DOCUMENTS

| | | |
|---|---|---|
| JP | 2006200512 | 8/2006 |
| JP | 2012-102689 A | 5/2012 |
| KR | 20100012602 | 2/2010 |
| KR | 20140073311 | 6/2014 |
| KR | 10-2014-0124663 A | 10/2014 |
| WO | 0153674 | 7/2001 |

* cited by examiner

*Primary Examiner* — Peter MacChiarolo
*Assistant Examiner* — Timothy Graves
(74) *Attorney, Agent, or Firm* — Brinks Gilson & Lione

(57) ABSTRACT

Disclosed herein is a fault diagnosis method of a thermostat including: confirming, by a controller, whether a flow stop valve is equipped in a vehicle; if it is determined that the flow stop valve is equipped in the vehicle, diagnosing the flow stop valve; and if it is determined that the diagnosis on the flow stop valve ends, diagnosing the thermostat to determine whether the thermostat is faulty.

10 Claims, 7 Drawing Sheets

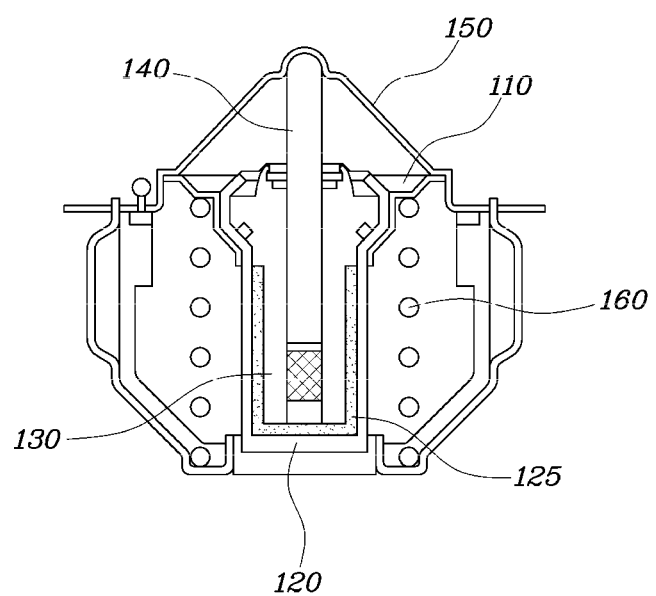
FIG. 2A    (PRIOR ART)

FAULT DIAGNOSIS METHOD OF THERMOSTAT

CROSS-REFERENCE TO RELATED APPLICATIONS

This application claims the benefit of Korean Patent Application No. 10-2015-0104569, filed on Jul. 23, 2015, the contents of which are incorporated herein by reference in its entirety.

FIELD

The present disclosure relates to a fault diagnosis method of a thermostat of a vehicle.

BACKGROUND

The statements in this section merely provide background information related to the present disclosure and may not constitute prior art.

Generally, a cooler is an apparatus which cools an engine to prevent the engine from overheating and maintain the engine at an operating temperature. The cooler have used an air cooling type which uses external air to directly cool the outside of the engine and a water cooling type which circulates cooling water into the engine to cool the engine.

As illustrated in FIG. 1, the water cooling type cooler is configured to include a water jacket 30 configured enclosing a cylinder 10 and a combustion chamber 20, a water pump 40 pumping water into the cylinder 10, a radiator 50 transferring heat of high-temperature cooling water to external air to cool the cooling water, a fan 60 assisting with ventilation of the radiator 50, a thermostat 100 for rapidly increasing a temperature of the cooling water to an operating temperature just after starting, etc. By this configuration, the water pump 40 circulates the cooling water into the water jacket 30 enclosing the cylinder 10 to cool heat generated from a cylinder block 70 and a cylinder head 80 and then the radiator 50 draws the cooling water warmed in the water jacket 30 to radiate the heat of the cooling water. Further, the water of which the heat is radiated from the radiator 50 is again circulated into the water jacket 30 to cool the engine.

Further, the fan forces the external air to come into contact with the radiator 50 to improve a heat radiation effect. Further, the thermostat 100 is installed in an upper channel 90 between the water jacket 30 and the radiator 50 and is controlled to be automatically opened and closed depending on a change in the temperature of the cooling water to control a flow rate flowing in the radiator 50 so as to maintain the temperature of the cooling water at an operating temperature, thereby switching a circulation path of the cooling water depending on the temperature.

An operation of the thermostat will be described below in more detail with reference to FIGS. 2A and 2B. FIG. 2A is a cross-sectional view illustrating a state in which the thermostat is closed and FIG. 2B is a cross-sectional view illustrating a state in which the thermostat is opened depending on the increase in the temperature of the cooling water inside the water jacket. As illustrated in FIG. 2A, if the temperature of the cooling water inside the water jacket rises beyond a defined temperature in the state in which the valve 10 is closed, a wax 125 inside a pallet 120 is expanded to compress a rubber 130 inserted into the pallet 120, such that a spindle 140 at a central portion of the rubber 130 may be pressurized upward. However, the spindle 140 is fixedly mounted on the bracket 150 and therefore the pallet 120 falls, such that a valve 110 may be opened as illustrated in FIG. 2B.

As illustrated in FIG. 2B, the valve 110 is opened to circulate the cooling water warmed in the water jacket into the radiator. As a result, if the temperature of the cooling water falls, the expanded wax 125 is contracted and the compression of the rubber 130 is removed, such that the pallet 120 returns to an original position by elasticity of the spring 160 as illustrated in FIG. 2A.

However, when the valve is opened even below the preset temperature due to the fault of the thermostat, the cooling water is continuously cooled by the radiator, and therefore the amount of heat lost by cooling among heat generated by the combustion is increased, thereby reducing heat efficiency of the engine, an ECU controlling a fuel injection amount based on the temperature of the cooling water increases the fuel injection amount to increase power consumption since the temperature of the cooling water is low, and a mixer making atomization of gasoline insufficient in a cylinder is provided to dilute engine oil with the gasoline and promote a cylinder wear. Further, a larger amount of exhaust gas is relatively generated than in a normal condition, which affects performance of other self-diagnosis apparatuses (oxygen sensor diagnosis, catalyst abnormality diagnosis, exhaust gas recirculation apparatus diagnosis, evaporation gas system leakage diagnosis, etc.).

As described above, the thermostat controls the temperature of the cooling water of the engine. In particular, when a flow stop valve is applied to the vehicle, a difference in the rising tendency of the temperature of the cooling water may occur. When the flow stop valve is applied, the rising in the temperature of the cooling water is rapid at an early time and even when the flow stop valve is normal and the thermostat is faulty, due to the flow stop valve, the rising in the temperature of the cooling water does not show a large difference from the case in which the thermostat is normal.

SUMMARY

In one form, the present disclosure provides a fault diagnosis method of a thermostat capable of avoiding misjudging the operation of the thermostat to be normal even if the thermostat may be faulty, by determining whether the thermostat is normal in consideration of a flow stop valve when the flow stop valve is applied.

One form of the present disclosure provides a fault diagnosis method of a thermostat, including the steps of confirming, by a controller, whether a flow stop valve is equipped in a vehicle; if it is determined that the flow stop valve is equipped in the vehicle, diagnosing the flow stop valve; and if it is determined that the diagnosis on the flow stop valve ends, diagnosing the thermostat to determine whether the thermostat is faulty.

The diagnosing of the flow stop valve may include deriving, by the controller, a model value of a temperature of cooling water and deriving an actual temperature value of the cooling water by measuring the temperature of the cooling water using a temperature sensor.

It may be confirmed in the diagnosing of the flow stop valve whether the diagnosis on the flow stop valve is completed and if it is confirmed that the diagnosis on the flow stop valve is not completed, the deriving of the temperature value may be repeatedly performed.

In the diagnosing of the thermostat, it may be determined whether the thermostat is faulty by comparing the model value and the temperature value derived in the deriving of the actual temperature value with a reference value previously input to the controller.

In the diagnosing of the thermostat, it may be determined that the thermostat is normal if the model value exceeds the reference value.

In the diagnosing of the thermostat, it may be determined that the thermostat is normal if the actual temperature value is the reference value or more.

In the diagnosing of the thermostat, it may be determined that the thermostat is faulty if the model value exceeds the reference value and the actual temperature value is below the reference value.

It may be determined in the diagnosing of the thermostat whether the flow stop valve is normal and it may be determined whether the thermostat is faulty by comparing the values derived in the deriving of the actual temperature value with the reference values previously input to the controller depending on whether the flow stop valve is normal.

If it is determined in the diagnosing of the flow stop valve that the flow stop valve is faulty and it is determined in the diagnosing of the thermostat that the model value exceeds the reference value and the actual temperature value is the reference value or more, it may be determined that the thermostat is normal.

If it is determined in the diagnosing of the flow stop valve that the flow stop valve is faulty and it is determined in the diagnosing of the thermostat that the model value exceeds the reference value and the actual temperature value is below the reference, it may be determined that the thermostat is faulty.

If it is determined in the diagnosing of the flow stop valve that the flow stop valve is normal and it is determined in the diagnosing of the thermostat that a value obtained by adding a predetermined margin previously input to the controller to the derived model value is below a minimum value of the actual temperature of the cooling water after the operation of the flow stop valve, it may be determined that the thermostat is normal.

If it is determined in the diagnosing of the flow stop valve that the flow stop valve is normal and it is determined in the diagnosing of the thermostat that a value obtained by subtracting a predetermined margin previously input to the controller from the derived model value exceeds the minimum value of the actual temperature of the cooling water after the operation of the flow stop valve, it may be determined that the thermostat is faulty.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 2A and 2B are views illustrating in detail a configuration of a thermostat of FIG. 1;

Figure 1:
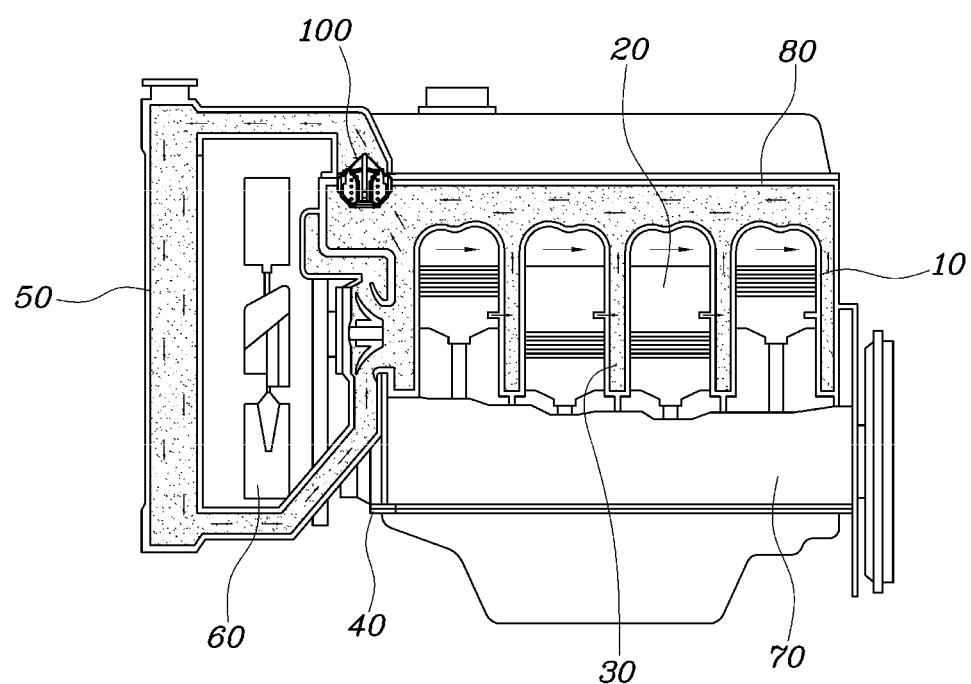
FIG. 1 is a view illustrating a configuration of a general cooler of a vehicle.
Figure 2B:
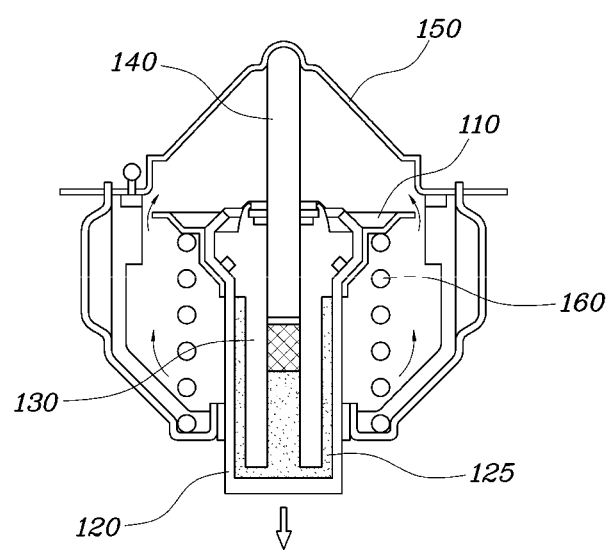

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a fault diagnosis method of a thermostat according to exemplary forms of the present disclosure will be described with reference to the accompanying drawings.

Figure 3:
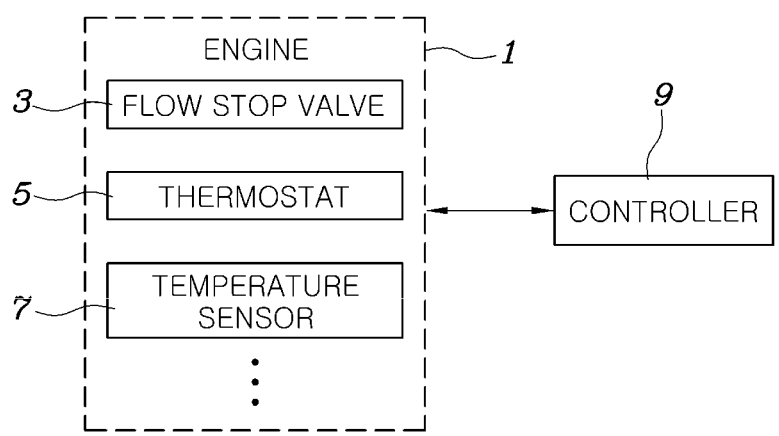
FIG. 3 is a block diagram illustrating a configuration of the cooler of the vehicle to which the present disclosure is applied.
Figure 4:
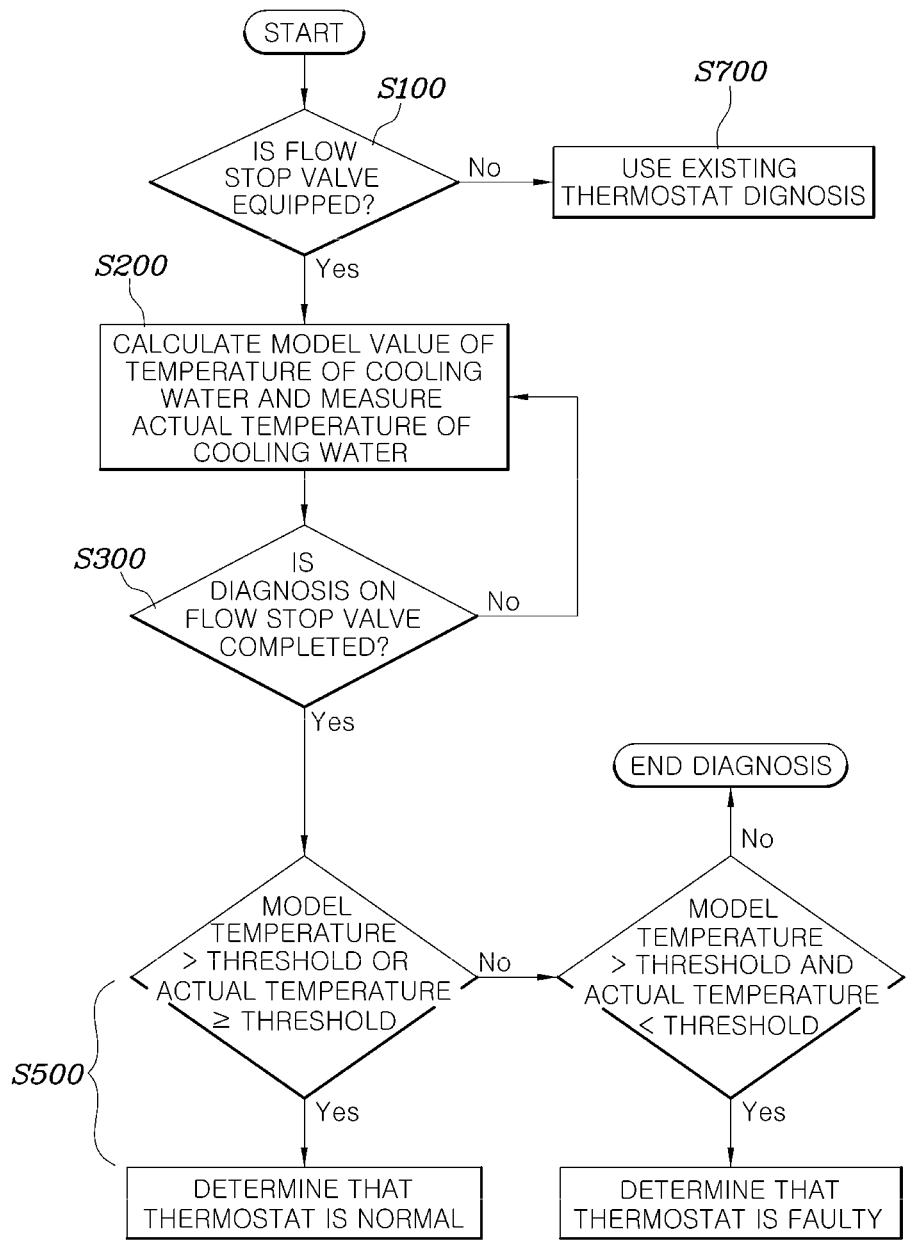
FIG. 4 is a flowchart illustrating a fault diagnosis method of a thermostat according to one form of the present disclosure.
Figure 5:
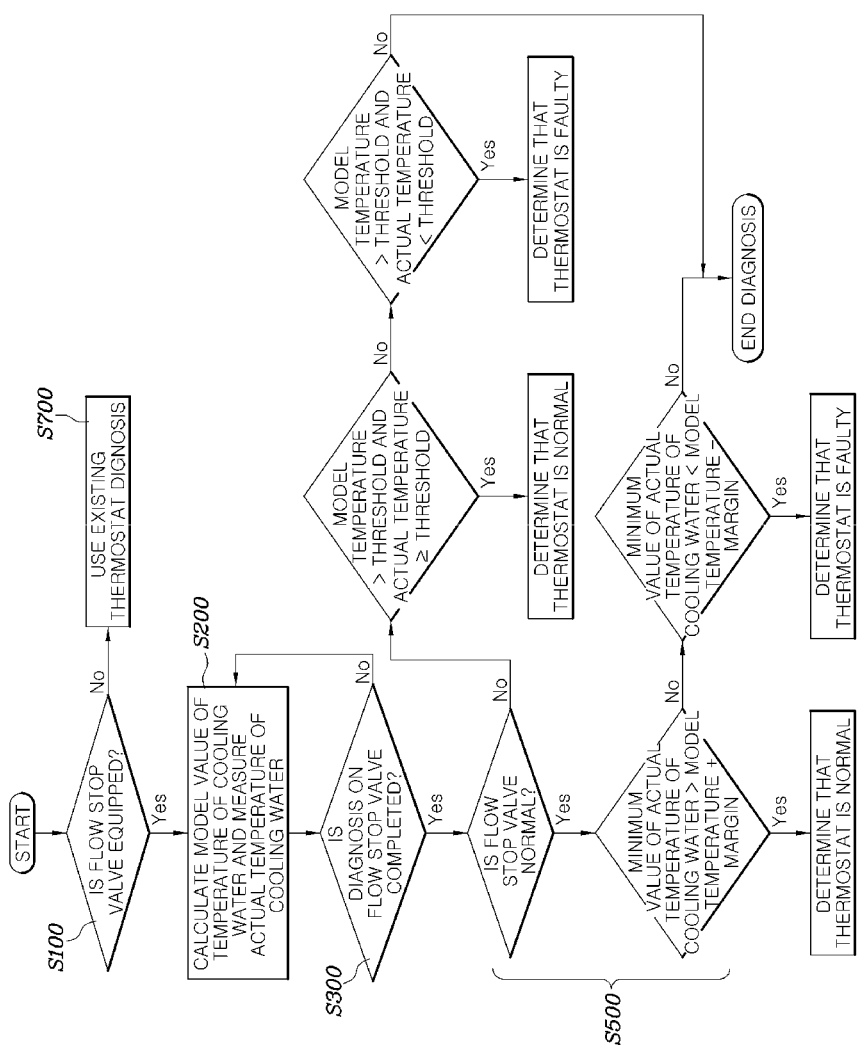
FIG. 5 is a flowchart illustrating a fault diagnosis method of a thermostat according to another form of the present disclosure.
Figure 6:
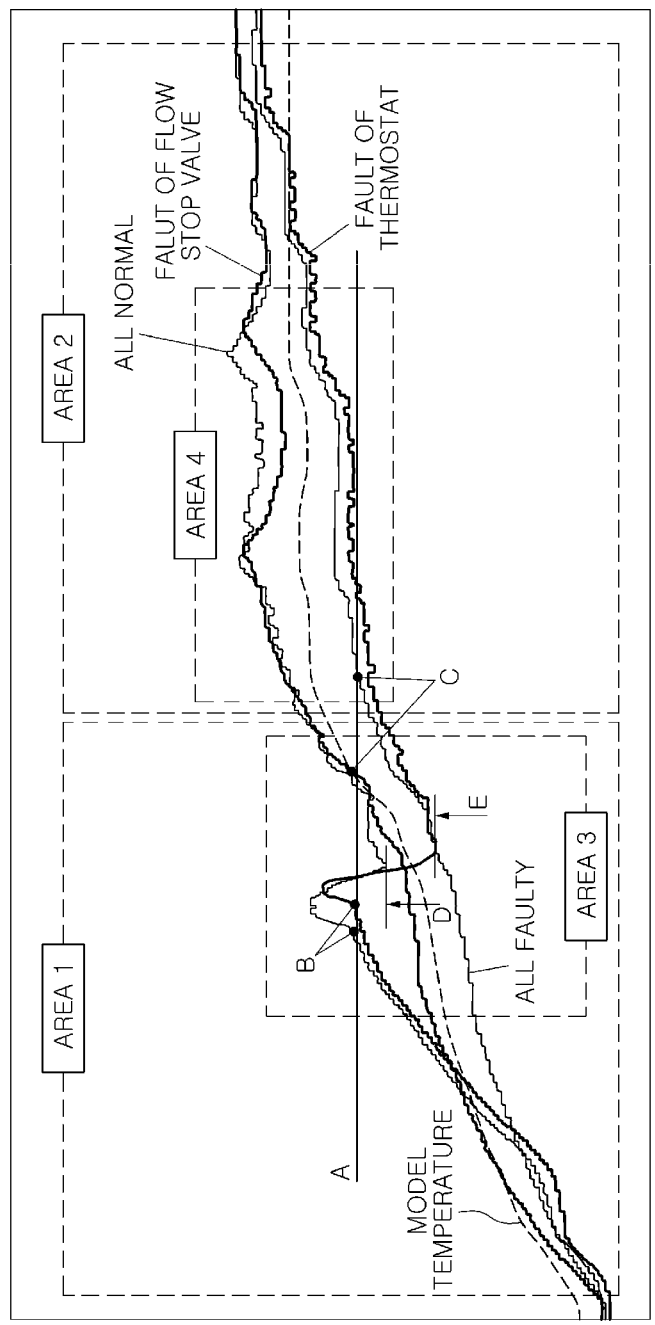
FIG. 6 is a graph for describing parameters for flowcharts in FIGS. 4 and 5.

FIG. 3 is a block diagram illustrating a configuration of one form of the cooler of the vehicle to which the present disclosure is applied, FIG. 4 is a flowchart illustrating a fault diagnosis method of a thermostat 5 according to one form of the present disclosure, and FIG. 5 is a flowchart illustrating a fault diagnosis method of a thermostat 5 according to another form of the present disclosure. Further, FIG. 6 is a graph for describing parameters for the flowcharts of FIGS. 4 and 5. Among fault diagnosis methods of a thermostat 5, one form of the present disclosure provides a fault diagnosis method of a thermostat capable of reducing the possibility of misjudging the thermostat 5 to be normal even if the thermostat 5 is faulty, by determining whether the thermostat 5 is normal in consideration of the flow stop valve 3 when a flow stop valve 3 is applied.

First, the fault diagnosis method of the thermostat according to one form of the present disclosure will be described with reference to FIGS. 3 and 4. The fault diagnosis method may include confirming, by a controller 9, whether a flow stop valve 3 is equipped in a vehicle (S100), if it is determined in S100 that the flow stop valve 3 is equipped in the vehicle, diagnosing the flow stop valve 3 (S300); and if it is determined in S300 that the diagnosis on the flow stop valve 3 is completed, diagnosing the thermostat to determine whether the thermostat 5 is faulty (S500, S500').

When the diagnosis starts, first, the controller 9 performs the confirming whether the flow stop valve 3 is equipped in the vehicle (engine 1) (S100). If it is confirmed in S100 that the flow stop valve 3 is equipped in the vehicle, the diagnosing of the flow stop valve 3 (S300) is performed. According to a first form of the present disclosure, it is confirmed whether the flow stop valve 3 is equipped in the vehicle and if it is confirmed that the flow stop valve 3 is equipped in the vehicle, the diagnosis on the flow stop valve 3 starts, however, it is not necessarily separately determined whether the flow stop valve 3 is normal.

The diagnosing of the flow stop valve (S300) may further include deriving, by the controller 9, a model value of a temperature of cooling water and deriving an actual temperature value of the cooling water by measuring the temperature of the cooling water using a temperature sensor 7 (S200). The model value means a temperature calculated by the controller when the temperature sensor measuring the temperature of the cooling water may be faulty. The model value and the actual temperature value are used as an index for diagnosing whether the thermostat 5 is faulty. Further, it is confirmed in the diagnosing of the flow stop valve (S300) whether the diagnosis on the flow stop valve 3 is completed. However, if it is confirmed that the diagnosis on the flow stop valve 3 is not completed, the deriving of the temperature value (S200) is repeatedly performed.

On the contrary, if it is confirmed in the diagnosing of the flow stop valve (S300) that the diagnosis on the flow stop valve 3 is completed, the diagnosing of the thermostat (S500) may be performed to determine whether the thermostat 5 is faulty. In the diagnosing of the thermostat (S500), it may be determined whether the thermostat 5 is faulty by comparing the model value and the temperature value derived in the deriving of the actual temperature value (S200) with the reference value previously input to the controller 9.

In more detail, in the diagnosing of the thermostat (S500), the controller 9 confirms whether the model value exceeds the reference value. If it is confirmed that the model value exceeds the reference value, it may be determined that the thermostat 5 is normal. Further, in the diagnosing of the thermostat (S500), the controller 9 confirms whether the actual temperature value measured by the temperature sensor 7 is the reference value or more. If the controller confirms that the actual temperature value is the reference value or more, the controller may determine that the thermostat 5 is normal.

However, in the diagnosing of the thermostat (S500), if the controller 9 confirms that the model value exceeds the reference value and the actual temperature value is below the reference value, it may be determined that the thermostat 5 is faulty. In this case, if it is determined that the thermostat 5 is faulty, the controller 9 may visually display the fault of the thermostat 5 on a cluster, etc., and/or generate a warning sound to inform a user of the fault of the thermostat 5, or the like.

Further, if it is confirmed in the confirming of the flow stop valve (S100) that the flow stop valve 3 is not equipped in the vehicle, the existing diagnosing of the thermostat (S700) to diagnose only the thermostat 5 as before may be independent of the flow stop valve 3 and is immediately performed. Here, in the existing diagnosing of the thermostat (S700), the controller 9 may separately derive the model value and the actual temperature value by the same method as the diagnosing of the thermostat (S500) according to the first form of a vehicle equipped with the flow stop valve of the present disclosure and compare the derived model value and actual temperature value with the reference value to determine whether the thermostat 5 is normal.

According to another form of the present disclosure, it is possible to determine whether the thermostat 5 is normal independent of whether the flow stop valve 3 is faulty. Illustrated in more detail, in FIG. 6, area 1 is an area for determining whether the flow stop valve 3 is normal, area 2 is an area for determining whether the thermostat 3 is normal after the diagnosis on the flow stop valve 3 is completed, and line A represents an operation condition of the flow stop valve 3.

That is, it is not substantially derived whether the flow stop valve 3 is normal. However, when the flow stop valve 3 is normal, after it is determined that the flow stop valve is operating normal in the area 1, the temperature of the cooling water falls and then again rises, and therefore it is possible to determine whether the thermostat 3 is operating normal in the area 2 which is a re-rising section of the temperature of the cooling water. When the flow stop valve 3 is faulty, it takes more time for the flow stop valve 3 to reach the operating temperature condition than a normal case, but the operating condition of the flow stop valve 3 is more rapidly set than the diagnosis temperature condition of the thermostat 5 to first perform the diagnosis on the flow stop valve 3, such that it is possible to diagnose whether the thermostat 5 is normal.

Next, the fault diagnosis method of the thermostat according to another form of the present disclosure will be described with reference to FIGS. 3 and 5. The fault diagnosis method of the thermostat may include confirming, by a controller 9, whether a flow stop valve 3 is equipped in a vehicle (S100), if it is determined in S100 that the flow stop valve 3 is equipped in the vehicle, diagnosing the flow stop valve 3 (S300); and if it is determined in S300 that the diagnosis on the flow stop valve 3 is completed, diagnosing the thermostat to determine whether the thermostat 5 is faulty (S500'). According to a second form of the present disclosure, first, it may determine whether the flow stop valve 3 is normal and then determine whether the thermostat 5 is normal depending on each reference according to whether the flow stop valve 3 is normal.

Referring to FIG. 6, area 3 is a case in which the flow stop valve 3 is normal and area 4 is a case in which the flow stop valve 3 is faulty. Further, point B is an operating timing at which the flow stop valve 3 is normal and point C is an operating timing at which the flow stop valve 3 may be faulty. Point D represents a minimum value of the actual temperature of the cooling temperature after the flow stop valve 3 is operated when the thermostat 5 is normal and point E represents a minimum value of the actual temperature of the cooling temperature after the flow stop valve 3 is operated when the thermostat 5 may be faulty.

Therefore, if the flow stop valve 3 is faulty and the thermostat 5 is normal, both of the actual temperature value and model value of the cooling water rapidly rise, and therefore it may be determined that the thermostat 5 is normal at a predetermined value or more. However, if the flow stop valve 3 is faulty and the thermostat 5 is faulty, the actual temperature value of the cooling water slowly rises, but the model value relatively rapidly rises, and therefore the model value is the predetermined value or more. However, if the actual temperature value is the predetermined value or less, it may be confirmed that the thermostat 5 is faulty.

Further, if the flow stop valve 3 is normal and the thermostat 5 is normal, the minimum value of the actual temperature of the cooling water is higher than the model value, and therefore it may be determined that the thermostat 5 is normal. Similarly, if the flow stop valve 3 is normal and the thermostat 5 is faulty, the minimum value of the actual temperature of the cooling water is lower than the model value, and therefore it may be determined that the thermostat 5 is faulty.

Therefore, the fault diagnosis method of the thermostat reflecting the above-mentioned contents may be proposed. Similar to the first tform of the present disclosure, first, the controller 9 performs and confirms whether the flow stop valve 3 is equipped in the vehicle (engine 1) (S100) and if it is confirmed in step S100 that the flow stop valve 3 is equipped in the vehicle, performs the diagnosing of the flow stop valve to diagnose the flow stop valve 3 (S300).

As previously discussed above, the diagnosing of the flow stop valve (S300) may further include deriving, by the controller 9, the model value of a temperature of cooling water and deriving an actual temperature value of the cooling water by measuring the temperature of the cooling water using a temperature sensor 7 (S200). The model value means temperature calculated by the controller when the temperature sensor measuring the temperature of the cooling water may be faulty. The model value and the actual temperature value are used as an index for diagnosing whether the thermostat 5 is faulty. Further, it is confirmed in the diagnosing of the flow stop valve (S300) whether the diagnosis on the flow stop valve 3 is completed. If it is confirmed that the diagnosis on the flow stop valve 3 is not completed, the deriving of the temperature value (S200) is repeatedly performed. In this form of the present disclosure, if it is confirmed in the diagnosing of the flow stop valve (S300) that the diagnosis on the flow stop valve 3 is completed, the diagnosing of the thermostat (S500') may be performed to determine whether the thermostat 5 is faulty.

According to the first form of the present disclosure, it is confirmed whether the flow stop valve 3 is equipped in the vehicle and if it is confirmed that the flow stop valve 3 is equipped in the vehicle, the diagnosing on the flow stop valve 3 starts, but it is not separately determined whether the flow stop valve 3 is normal. However, according to the second form of the present disclosure, if it is determined in S300 that the diagnosis on the flow stop valve 3 is completed, the diagnosing of the thermostat (S500') is performed. First, it is determined whether the flow stop valve 3 is normal and then it may determine whether the thermostat 5 is faulty. Therefore, the controller may determine in the diagnosing of the thermostat (S500') whether the flow stop valve 3 is normal and it is then determined whether the thermostat 5 is faulty by comparing the values derived in the deriving of the temperature value (S200) with the values previously input to the controller 9 depending on whether the flow stop valve 3 is normal.

Therefore, if it is determined in the diagnosing of the flow stop valve (S300) that the flow stop valve 3 is faulty and it satisfies in the diagnosing of the thermostat (S500') the condition that the model value exceeds the reference value and the actual temperature value is the reference value or more, the controller 9 may determine that the thermostat 5 is normal. Further, if it is determined in the diagnosing of the flow stop valve (S300) that the flow stop valve 3 is faulty and it satisfies in the diagnosing of the thermostat (S500') the condition that the model value exceeds the reference value and the actual temperature value is below the reference value, the controller 9 may determine that the thermostat 5 is also faulty.

On the contrary, if it is determined in the diagnosing of the flow stop valve (S300) that the flow stop valve 3 is normal and it is determined in the diagnosing of the thermostat (S500') that a value obtained by adding a predetermined margin previously input to the controller 9 to the derived model value is below the minimum value of the actual temperature of the cooling water after the operation of the flow stop valve 3, it may determine that the thermostat 5 is normal. However, if it is determined in the diagnosing of the flow stop valve (S300) that the flow stop valve 3 is normal and it is determined in the diagnosing of the thermostat (S500') that a value obtained by subtracting a predetermined margin previously input to the controller from the derived model value exceeds the minimum value of the actual temperature of the cooling water after the operation of the flow stop valve 3, the controller 9 may determine that the thermostat 5 is faulty.

Similar to the first form of the present disclosure, the controller 9 may visually display the fault of the flow stop valve 3 or the fault of the thermostat 5 on the cluster of the vehicle, etc., and/or generate a warning sound to inform the user of the fault of each part, or the like, when the flow stop valve 3 is faulty or when the thermostat 5 is faulty.

Further, if it is confirmed in the confirming of the flow stop valve (S100) that the flow stop valve 3 is not equipped in the vehicle, the existing diagnosing of the thermostat (S700) to diagnose only the thermostat 5, as before independent of the flow stop valve 3 is immediately performed. Here, in the existing diagnosing of the thermostat (S700), the controller may separately derive the model value and the temperature value by the same method as the diagnosing of the thermostat (S500) according to the first form of the present disclosure and compare the derived model value and temperature value with the reference value to determine whether the thermostat 5 is normal.

The forms of the present disclosure may end logic of diagnosing the fault by holding the determination on whether the thermostat 5 is faulty when they do not correspond to the normal or faulty determination on the thermostat 5.

According to the fault diagnosis method of the thermostat having the above-mentioned structure, it is possible to improve the durability of the vehicle and the quality of the vehicle by the fault diagnosis method of the thermostat capable of avoiding misjudging of the thermostat to be normal even if the thermostat is faulty when the flow stop valve is applied.

Although the present disclosure has been shown and described with respect to various forms, it will be obvious to those skilled in the art that the present disclosure may be modified and altered without departing from the spirit and scope of the present disclosure as defined by the following claims.

What is claimed is:

1. A fault diagnosis method of a thermostat, comprising:
   confirming, by a controller, whether a flow stop valve is equipped in a vehicle;
   when the controller confirms that the flow stop valve is equipped in the vehicle, diagnosing, by the controller, whether an operation of the flow stop valve is normal, wherein the diagnosing of whether the operation of the flow stop valve is normal includes:
   deriving, by the controller, a model value of a temperature of cooling water, and
   deriving an actual temperature value of the cooling water by measuring the temperature of the cooling water using a temperature sensor;
   confirming, by the controller, whether the diagnosing of whether the operation of the flow stop valve is normal ends; and
   when the controller confirms that the diagnosing of whether the operation of the flow stop valve is normal ends, diagnosing, by the controller, whether an operation of the thermostat is faulty or normal, wherein the diagnosing of whether the operation of the thermostat is faulty or normal includes:
   comparing, by the controller, the values derived in the deriving of the actual temperature value with values previously input to the controller, wherein the comparing depends on whether the controller diagnoses the operation of the flow stop valve as being normal, and
   when the controller diagnoses the operation of the flow stop valve as being normal and determines that a value obtained by adding a predetermined margin previously input to the controller to the model value is below a minimum value of the actual temperature of the cooling water after the operation of the flow stop valve, diagnosing, by the controller, the operation of the thermostat as being normal.

2. The fault diagnosis method of claim 1, wherein if it is confirmed that the diagnosing of whether the operation of the flow stop valve is normal is not completed, the deriving of the actual temperature value is repeatedly performed.

3. The fault diagnosis method of claim 1, wherein it is determined whether the operation of the thermostat is faulty or normal by comparing the model value and the actual temperature value with a reference value previously input to the controller.

4. The fault diagnosis method of claim 3, wherein in the diagnosing of whether the operation of the thermostat is faulty or normal, it is determined that the operation of the thermostat is normal if the model value exceeds the reference value.

5. The fault diagnosis method of claim 3, wherein in the diagnosing of whether the operation of the thermostat is faulty or normal, it is determined that the operation of the thermostat is normal if the actual temperature value is the reference value or more.

6. The fault diagnosis method of claim 3, wherein in the diagnosing of whether the operation of the thermostat is faulty or normal, it is determined that the operation of the thermostat is faulty if the model value exceeds the reference value and the actual temperature value is below the reference value.

7. The fault diagnosis method of claim 1, wherein if it is determined in the diagnosing of whether the operation of the flow stop valve is normal that the operation of the flow stop valve is faulty and it is determined in the diagnosing of the whether the operation of the thermostat is faulty or normal that the model value exceeds the reference value and the actual temperature value is the reference value or more, it is determined that the operation of the thermostat is normal.

8. The fault diagnosis method of claim 1, wherein if it is determined in the diagnosing of whether the operation of the flow stop valve is normal that the operation of the flow stop valve is faulty and it is determined in the diagnosing of whether the operation of the thermostat is faulty or normal that the model value exceeds the reference value and the actual temperature value is below the reference, it is determined that the operation of the thermostat is faulty.

9. The fault diagnosis method of claim 1, wherein if it is determined in the diagnosing of whether the operation of the flow stop valve that the operation of the flow stop valve is normal and it is determined in the diagnosing of whether the operation of the thermostat is faulty or normal that a value obtained by subtracting a predetermined margin previously input to the controller from the model value exceeds a minimum value of the actual temperature of the cooling water after the operation of the flow stop valve, it is determined that the operation of the thermostat is faulty.

10. A fault diagnosis method of a thermostat, comprising:
confirming, by a controller, whether a flow stop valve is equipped in a vehicle;
when the controller confirms that the flow stop valve is equipped in the vehicle, diagnosing, by the controller, whether an operation of the flow stop valve is normal, wherein the diagnosing of whether the operation of the flow stop valve is normal includes:
deriving, by the controller, a model value of a temperature of cooling water, and
deriving an actual temperature value of the cooling water by measuring the temperature of the cooling water using a temperature sensor;
confirming, by the controller, whether the diagnosing of whether the operation of the flow stop valve is normal ends; and
when the controller confirms that the diagnosing of whether the operation of the flow stop valve is normal ends, diagnosing, by the controller, whether an operation of the thermostat is faulty or normal, wherein the diagnosing of whether the operation of the thermostat is faulty or normal includes:
comparing, by the controller, the values derived in the deriving of the actual temperature value with values previously input to the controller, wherein the comparing depends on whether the controller diagnoses the operation of the flow stop valve as being normal, and
when the controller diagnoses the operation of the flow stop valve as being normal and determines that a value obtained by subtracting a predetermined margin previously input to the controller from the model value exceeds a minimum value of the actual temperature of the cooling water after the operation of the flow stop valve, diagnosing, by the controller, the thermostat as being faulty.

\* \* \* \* \*